Jan. 11, 1955  K. McLEOD ET AL  2,699,091
MAGAZINE VIEWER FOR STEREOSCOPIC PRINTS
Filed June 23, 1953  5 Sheets-Sheet 3

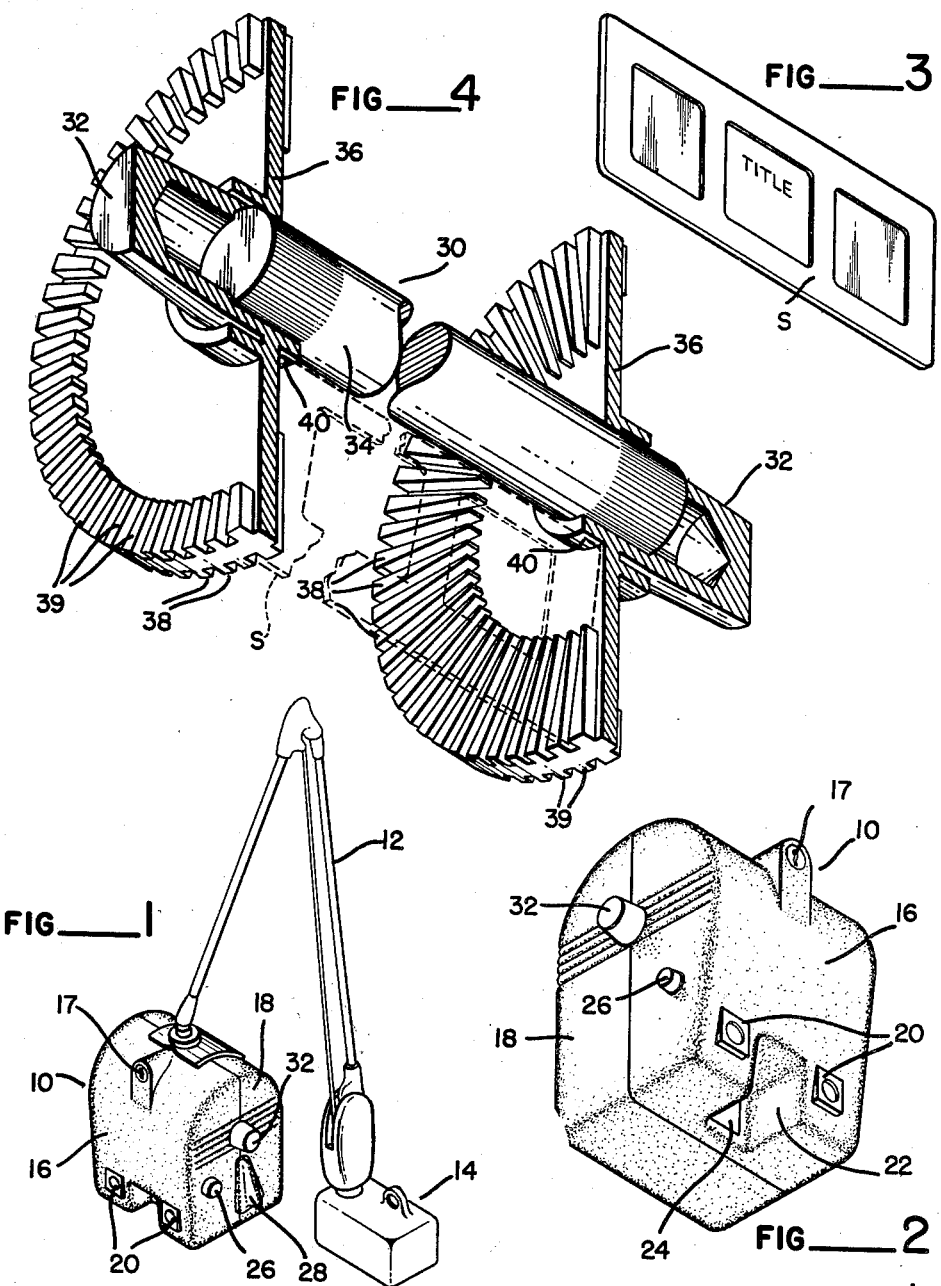

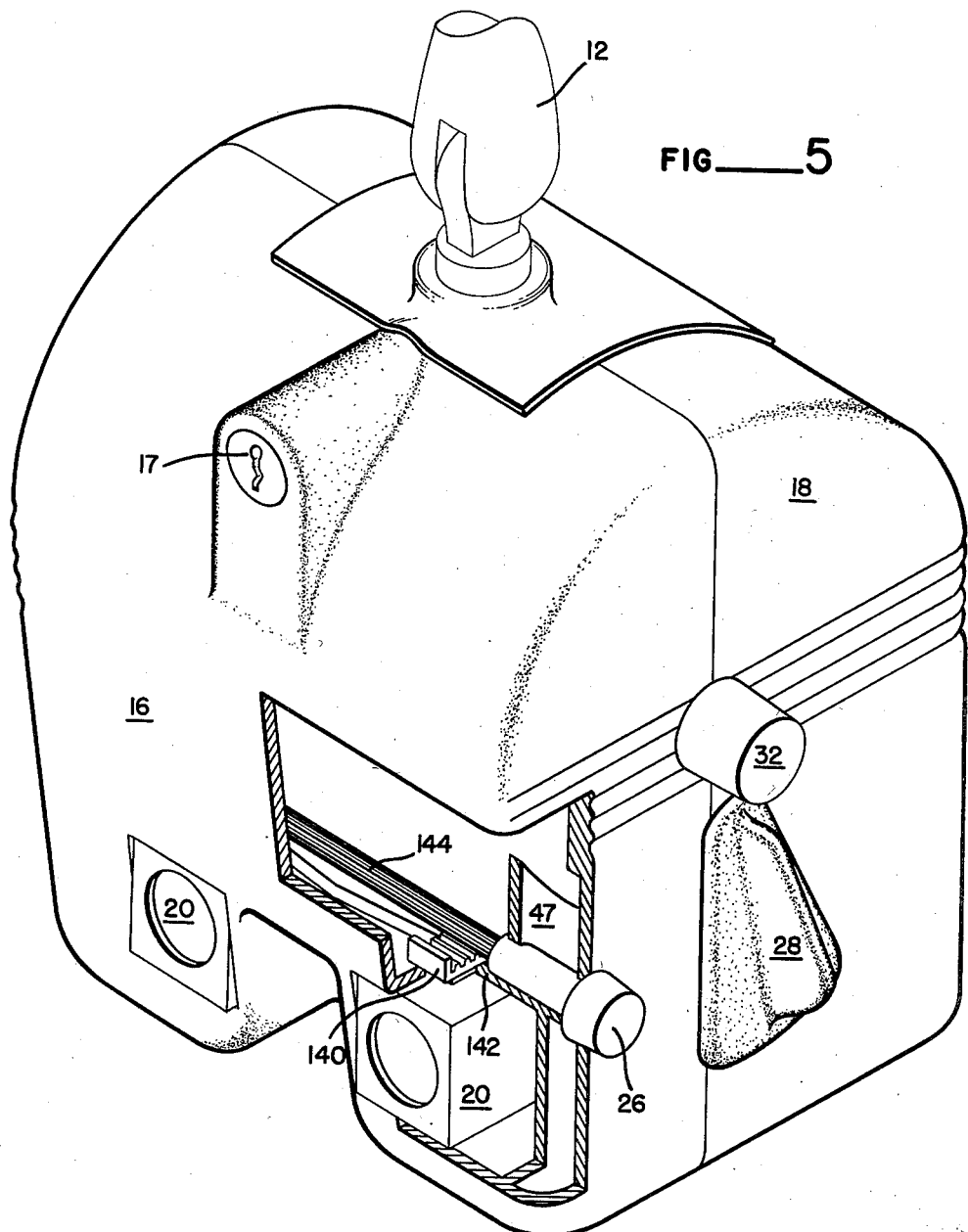

KEN MCLEOD &
STAN E. PERRY
INVENTOR

BY Smith & Tuck

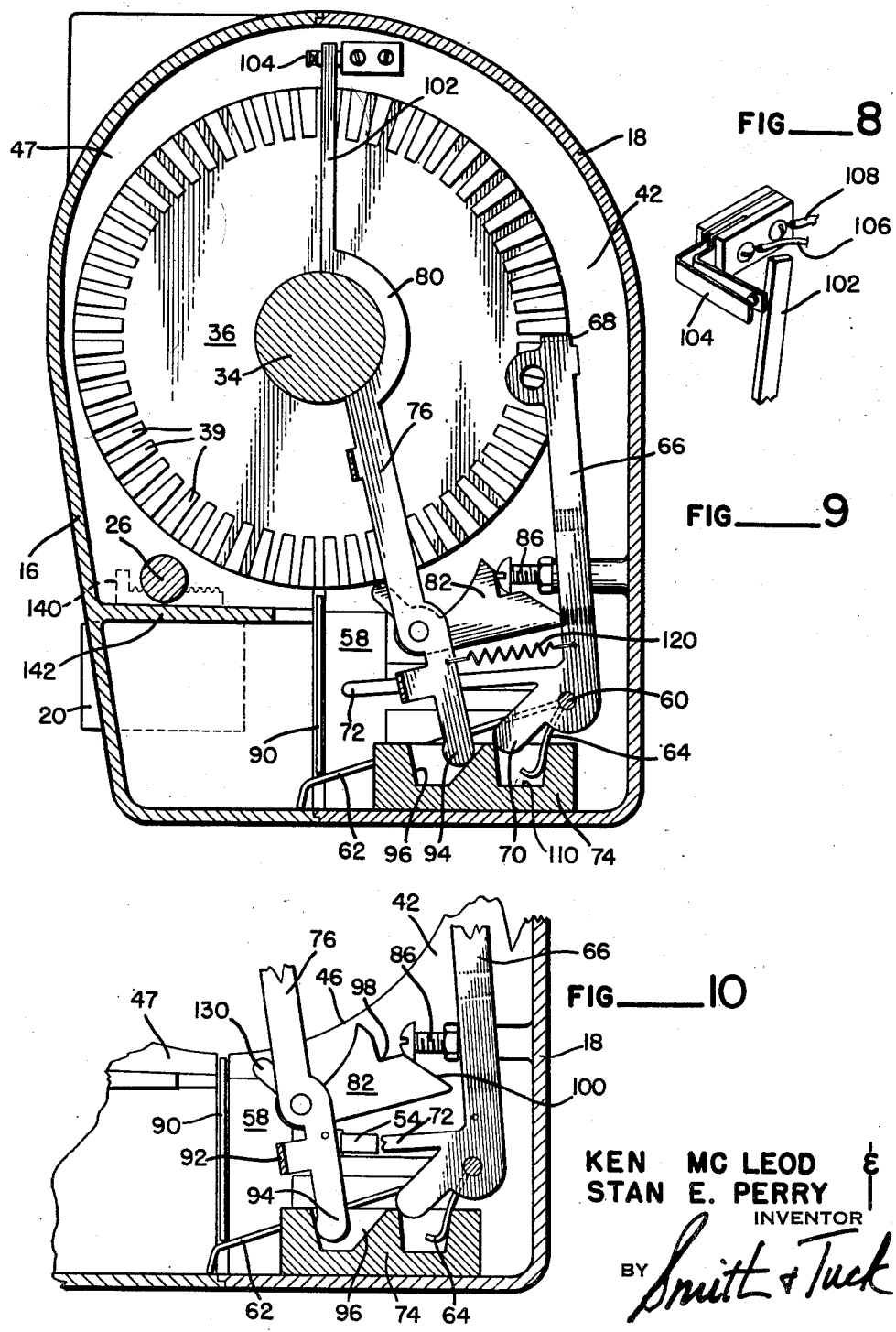

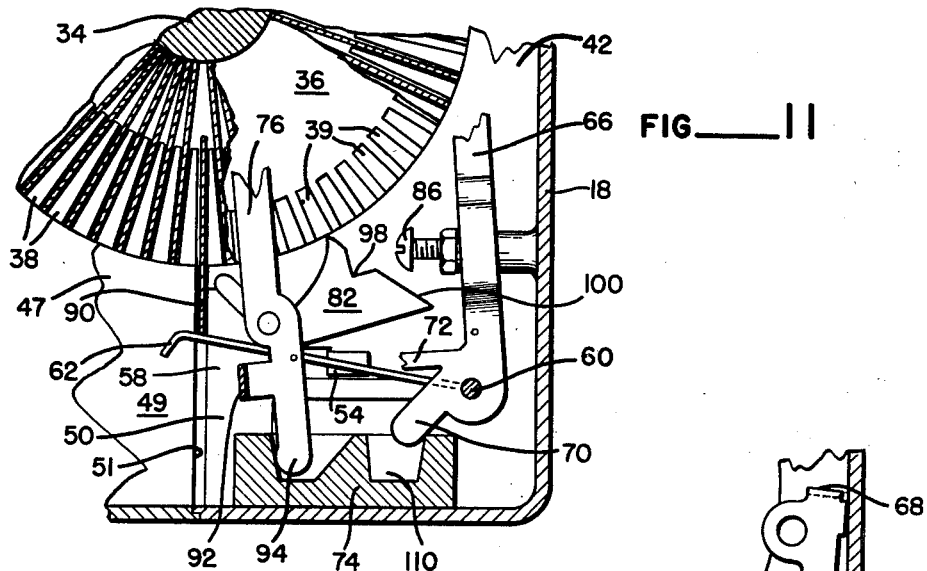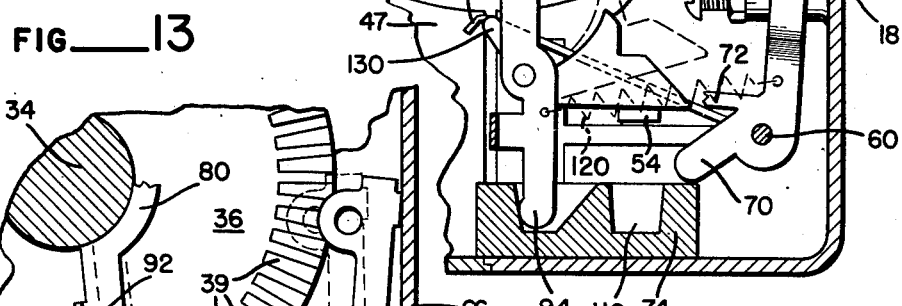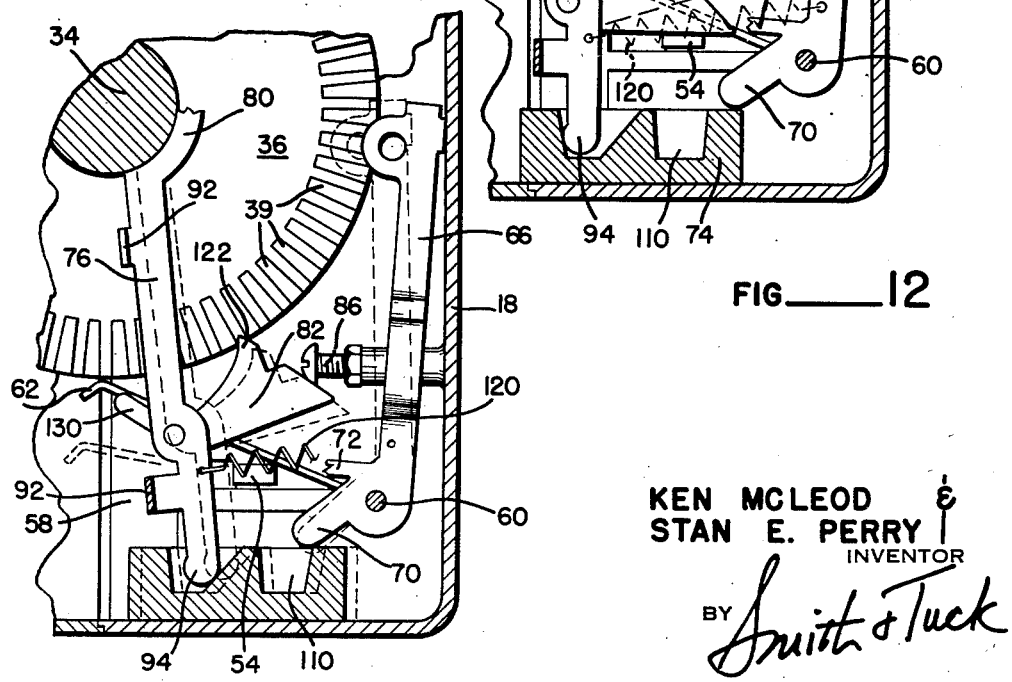

United States Patent Office 2,699,091
Patented Jan. 11, 1955

2,699,091
MAGAZINE VIEWER FOR STEREOSCOPIC PRINTS

Ken McLeod and Stan E. Perry, Seattle, Wash., assignors to Ster-E-O, Inc., Seattle, Wash., a corporation Application June 23, 1953, Serial No. 363,545

8 Claims. (Cl. 88—31)

Our invention relates to stereoscopic pictures and more specifically to a magazine viewer for stereoscopic prints. This viewer is arranged so as to be coin-operated and has a housing mounted on a parallel linkage or similar arm. A battery of frames carrying paired stereoscopic prints is mounted in a carrier in radial relationship to the axis of rotation of the carrier. Means are provided for individually withdrawing a frame from said battery, into position for viewing and for simultaneously returning another viewable frame, by operation of an operating handle. Another operation of the handle positions the frame back in the bank and brings the next frame into position to be viewed.

With improvements in stereoscopic cameras and prints, the stereoscopic viewer is now enjoying considerable popularity. The present viewer may be used in the home but is also adapted for use in public places where a charge may be made for viewing the prints. The stereoscopic viewer could be used in many types of commercial establishments such as railroad stations where the customer can amuse himself between trains by viewing natural scenes and the like. Another use would be in museums for items not available in other forms than pictures with the charges being only nominal in order to insure turnover in the number of persons using the viewer. With the excellent results now obtained in stereoscopic prints, and especially in colored film, this should add a worthwhile recreational and educational device susceptible of commercialization. Photographers presently engaging in artistic photography through the stereoscopic camera will thus have an additional method of obtaining remuneration for their work, which is at present somewhat difficult, because the prints are not suitable for publication in magazines or the like, in the manner of the two-dimensional photograph. Another application of the viewer is in saleswork where a display of merchandise could be made from a bank of prints.

The objectives of our invention include therefore to provide a viewer for stereoscopic prints especially for commercial use on a coin-operated basis and to thus make an additional recreational and educational medium open to the public; to mount the viewer in such a manner as to facilitate viewing while preventing the viewer from being removed; to devise a compact viewer with a large number of prints available without excess bulk; to mount a multiplicity of stereoscopic frames in a cylindrical bank, and to devise means for singly withdrawing frames from the bank for viewing by the simple operation of a handle external of the viewer housing; and to devise an economical unit of this type of pleasing appearance.

Our invention will be best understood, together with the additional objectives and advantages thereof, from a reading of the following description, taken with reference to the drawings, in which:

Figure 1 is a perspective view of a specific embodiment of our viewer, including the supporting structure;

Figure 2 is a perspective view of the housing at a different angle and on an enlarged scale from Figure 1;

Figure 3 is a perspective view of a frame for mounting stereoscopic prints;

Figure 4 is a perspective view, with certain parts cut away, showing the carrier for such a battery of frames, the position of the frames being generally indicated by the dotted lines;

Figure 5 is a perspective view of the housing taken in the same sense as Figure 1, with certain parts cut away to show interior construction;

Figure 8 is a perspective view, in fragmentary form, of a light switch in the viewer;

Figure 9 is a side view, partly in section; and

Figures 10 to 13 show successive positions of operating parts in the viewer.

Figure 6:
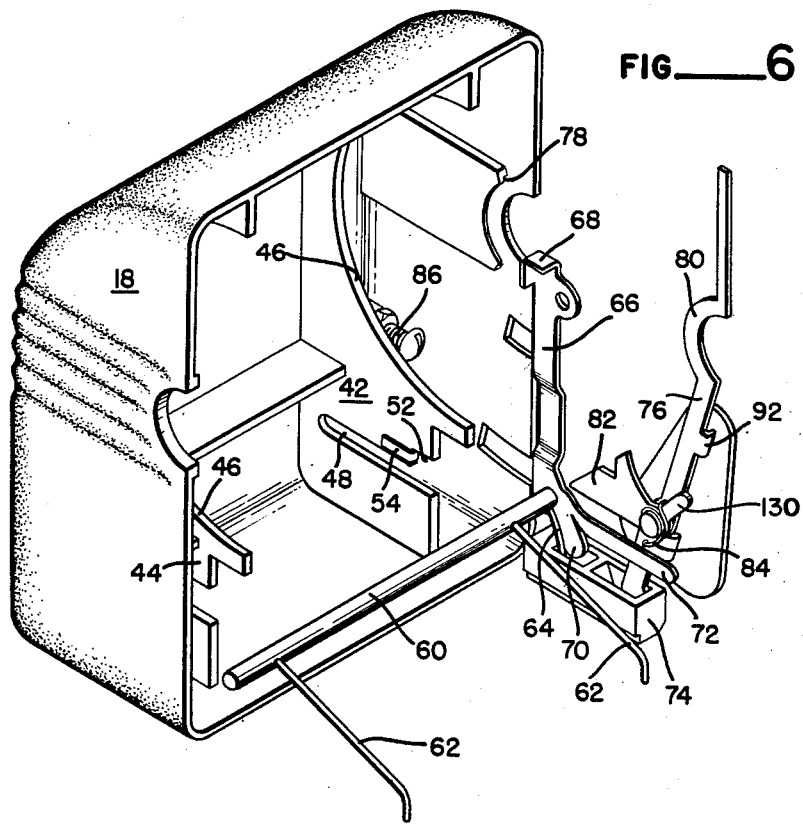
Figure 6 is a perspective view of part of the housing and operating mechanism.

In this viewing machine the standard stereoscopic slides S are used wherein the two films are held in spaced relationship with the space therebetween displaying a title card. Our viewing machine 10 as shown in Figure 1 is the model developed for viewing at a counter. Viewer 10 is suspended by a counterbalancing type free swinging arm 12 which is mounted upon the counter top. The mounting includes a coin-operated mechanism which permits electricity to pass the parallel linkage arm 12 and into viewer 10 for a limited period after deposit of a coin.

The housing for our viewer consists of a front cover 16 and a back cover 18 which are normally fixed together by a lock 17. Near the bottom of the front cover 16 are the lens tubes 20 which are spaced apart the same distance as the average human eyes. Interposed between lens tubes 20 is a relieved portion 22 which serves a dual purpose. While in use recess 22 accepts the bridge of the user's nose so he may comfortably place his eyes near the lens tubes and an opening 24 in the back of recess 22 displays the title card of the slide being viewed. On each side of the front cover 16 protrudes a lens adjusting knob 26, the operation of which will be more fully described subsequently. This completes the exterior of the front cover 16.

From the back cover 18 protrudes the operating handle 28 and from the juncture line of the front and the back cover extend the ends 32 of the slide carrier 30. Carrier 30, which is best shown in Figure 4, has an axle 34 to which are fixed two identical carrier discs 36. Extending therefrom, on each face of the discs 36, is a series of wedge-shaped lugs 38, 39. The spacing of these lugs leaves a series of slots therebetween radially disposed around the axis of the axle 34. The space between the discs 36 is slightly more than the length of the film slide and the slot formed by the space between these lugs 38 must be slightly greater than the thickness of the slide, which thereby forms a series of guideways into which the slides are placed. With the top edge of the slides S abutting the shoulders 40 extending inwardly from discs 36 around the axle 34, the slides extend radially around the axle so that the outer edges, which are the lower edges of the slides as viewed, lie in a plane approximating that of the periphery of the discs 36. The lugs 39 and radial slots formed on the outer surfaces of discs 36 are for rotating and positioning the slide carrier 30 as will be further described.

Within the back cover 18 we have provided a pair of vertically extending intermediate walls 42 and 44. The upper portions of these walls have annular relieved portions 46 to accept the slide carrier 30. This keeps the slides from falling from the slots when not in use. The front cover 16 has a matching pair of relieved intermediate walls 47, 49 which when in use form a retaining ring abutting at the top with the walls 42 and 44 of the back cover while providing a space between the intermediate walls of the front cover and back cover at their lower portions, as at 51. This space is just wide enough to allow one slide to drop out of the carrier and into a viewing position.

Figure 7:
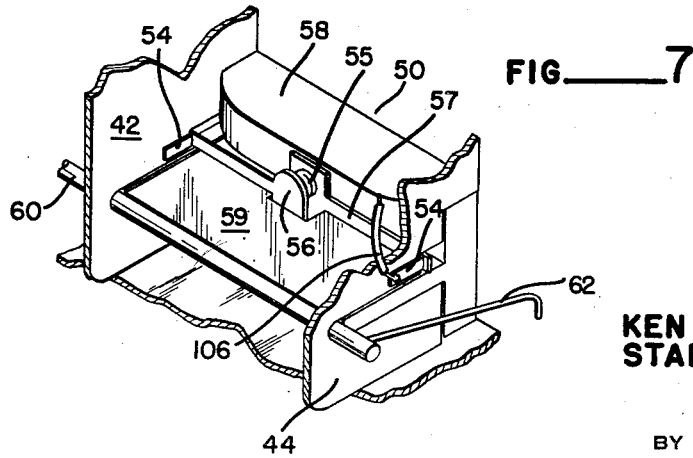
Figure 7 is a perspective view, in fragmentary form, showing details of the light-projecting means in the viewer.

The lower portions of walls 42 and 44 are relieved as shown in Figure 6 to accept the light source 50 as shown in Figure 7. A slot 48 extends inwardly in a horizontal plane to position the slide elevator shaft 60. Slots 48 are provided with a wide portion 52 near their open ends wherein are positioned the electrical contact clips 54. The contact clips are wired to the power source by wires runing through supporting arm 12 in the conventional manner and transmit this power to the light 55 through the conductors 56 and 57. These conductors are on the back side of the light assembly with the element or bulb portion of the light globes extending within the light reflector 58. Fixed to the back of the reflector 58 is a plate 59 which extends into the slots 48 and holds the slide elevator shaft 60 in place.

Slide elevator shaft 60 is rotatably mounted and has extending therefrom a pair of slide elevator fingers 62 and a shaft actuating finger 64; and rotatably mounted on shaft 60 is the carrier lock arm 66. Lock arm 66 has at its uppermost end a carrier engaging clip 68 which normally extends into one of the slots between lugs 39 on the outer surface of the carrier discs 36. The lower end of the lock arm 66 as at 70 serves to automatically actuate the lock arm 66 while a manual actuating arm as 72 extends forwardly from the lock arm, the use of which will be later covered. Elevator shaft 60 and lock arm 66 are actuated by the sliding cam 74 which in turn is impelled by the operating arm 76 to which handle 28 is affixed. Operating arm 76 pivots on the axis of the carrier 30 and is held in guideway 78 into which the periphery of the arcuate portion 80 fits. The inside of curve 80 fits around the hub of the carrier assembly and is thereby pivotally mounted.

Operating arm 76 carries a carrier positioning pawl 82 pivoted to its lower portion. Pawl 82 is positioned directly below the lugs 39 on the outer surface of discs 36 and is urged into contact with these lugs by means of a torsion spring 84. A screw and jamb nut assembly 86 protruding into the path of pawl 82 disengages it from carrier 30 at the desired sequential point.

To describe an operating cycle at this point, Figure 9 shows the moving parts in the position they assume during viewing of a print. It will be seen that carrier-engaging clip 68 is engaged in one of the grooves between lugs 39 preventing movement of discs 36 until the frame shown at 90 is returned to its position in the bank of frames. Operating handle 28 is in the position shown in Figure 5 and, to change frames, it is manually moved to the left as viewed in Figure 5. As operating handle 28 is so moved, operating arm 76, connected to operating handle 28 by lug 92, is moved therewith and assumes the position shown in Figure 10. This initial movement does not affect the position of sliding cam 74 as end 94 of operating arm 76 is merely moved to the other end of the first camming recess 96. However notch 98 of pawl 82 becomes disengaged from stop 86 which starts to ride on the inclined surface 100 of pawl 82. A second action during the sequence from Figure 9 to Figure 10 is that the upper end 102 of operating arm 76 moves from the position shown in Figure 9 to that shown in Figure 8, releasing the normally closed contact switch 104 which turns out the light. Switch 104 has leads 106 and 108 leading to the light source assembly shown in Figure 7, switch 104 being in series with light 55. It may be noted that a preferred form of the coin-operated box 14 has a switch in series with light source 55 which remains closed for an interval of time after a coin is deposited therein during which time as many frames may be viewed as the customer prefers, depending on the number of times that operating handle 28 is activated.

The next action in the part is shown by the movement from Figure 10 to Figure 11 in which end 94 of operating arm 76 has moved against the forward wall of the camming recess 96 moving the sliding cam 74 forward. This action releases pawl 82 from contact with stop 86 whereupon the pawl 82 moves in a counterclockwise direction, as viewed in Figure 11, by action of spring 84. The forward movement of operating arm 76 moves cam 74 whereby the rear camming recess 110 of cam 74 acts against bell crank arm 70 of carrier lock-arm 66 moving clip 68 towards withdrawal from the grooves between lugs 39. This is timed so that the clip does not become disengaged until frame 90 has reached a position within guideway 38. Meanwhile shaft-actuating finger 64 has been likewise acted upon by rear camming recess 110 of cam 74 and slide elevator fingers 62 are moved upward carrying frame 90 back into the bank of frames.

By the time that cam 74 has reached its forward-most position shown in Figure 12, crank arm 70 has pivoted clip 68 out of engagement with the grooves and frame 90 has reached its normal position in the bank of films. Meanwhile pawl 82 has reached the position shown in dotted lines in Figure 12 in which it is disposed to engage one of the lugs forming the groove 39.

Operating handle 28 could be manually returned to position but it is preferred to make this return automatic through the action of spring 120 which connects operating arm 76 and carrier lock arm 66. Thus when operating handle 28 is released spring 120 pulls end 94 of operating arm 76 rearwardly. The initial rearward movement of cam 74 does not affect the position of carrier lock arm 66 because its arm 70 is riding on a horizontal surface as shown in Figure 12. Pawl 82 follows a sequence of positions from that shown in Figure 12 to that shown in full lines in Figure 13 and then to the position shown in dotted lines in Figure 13. The pointed end 122 of pawl 82 engages one of the lugs 39 and moves the same through an arc, adjustable through stop 86, measuring the distance between frames; whereupon the next adjacent frame in a clockwise direction as viewed in Figure 11 is aligned with the guideway 51 in position to drop therein.

Timed with the movement of pawl 82, the bell crank 70 of carrier lock arm 66 drops into the rear camming recess 110 of cam 74 as shown in Figure 13 so that clip 68 is engaged between lugs 39 before the next frame fully descends into guideway 51. The actuating finger 64 at this time drops into camming recess 110 permitting the slide elevating arms 62 to descend with the next frame.

The operating parts assume the position shown in dotted lines in Figure 13 and then return to the position shown again in Figure 9 to complete the operating cycle. It will be observed that stop 86, acting on inclined surface 100 of pawl 82, enters notch 98 of pawl 82 in the position shown in Figure 9. By the time the frames have dropped to the viewing position, operating arm 76 has pivoted sufficiently so that the switch 104 is again closed through the action of the end 102.

Arms 130 and 72, of pawl 82 and lock arm 66 respectively, are for purposes of manual operation of these parts so that they will not engage lugs 39 as the equipment is being serviced, such as by replacement of slides S.

It will be noted that carrier 30 may be moved by rotation of ends 32 extending outward of the housing; and in this case the ends 32 are rotated while operating handle 28 is in its forwardmost position and the action of pawl 82 is merely to assure centering of the selected frame.

Viewing is accomplished through lenses 20 which depend from racks 140, which slide on flanges 142 positioned between racks 140 and the upper surface of lenses 20. Pinion shaft 144 engages the pair of racks 140 and is rotated by external operating knob 26, shaft 144 being journaled in walls 47, 49.

It is believed that it will be clearly apparent from the above description and the disclosure in the drawings that the invention comprehends a novel construction of a magazine viewer for stereoscopic prints.

Having thus disclosed our invention, we claim:

1. A mechanism for orienting a rotary member, comprising: a supporting frame and a horizontal shaft positioned in said frame, said rotary member having means forming a series of grooves on one end arranged in radial relationship to the axis of said shaft; a lock arm pivotally mounted in said frame and having its upper end movable between a first position free from said rotary member and a second position engaging said grooves locking said rotary member against movement; an operating arm pivotally mounted in said frame and a pawl mounted on said operating arm in position to be engageable with said grooves; a sliding cam mounted in said frame to slide horizontally and a manually-operable operating handle connected to said cam and operative to move said cam; and the lower ends of said lock and operating arms bearing on said cam and movement of said cam back and forth by said operating handle in an operating cycle moving said lock arm from said second position to said first position and back to said second position and in unison moving said operating arm in a manner whereby said pawl engages one of said grooves and moves said rotary member through an arc equal to the distance between grooves in the period said lock arm is not engaged with said grooves.

2. A viewer for prints mounted in substantially rectangular frames, comprising: a housing and a horizontal shaft positioned in said housing; a pair of rotatable members positioned on said shaft in spaced relationship, said rotatable members having means on their opposed faces forming a multiplicity of radially directed guideways to accommodate such frames in a radially aligned annular bank; means for viewing such frames at a level below said guideways; guide means disposed to receive such a frame from said guideways and to guide it into position in said viewing means and retaining means positioned to prevent frames of such bank from sliding out of said guideways other than through said guide means; one of said rotatable members having means forming a series of grooves near its periphery arranged in radial relationship to the axis of said shaft; a lock arm pivotally mounted in said housing and having one end movable between a first position free from said grooves and a second position engaging said grooves locking said rotatable members against movement; an operating arm pivotally mounted in said housing and a pawl mounted on said operating arm in position to be engageable with said grooves; and manually operable means operative in an operating cycle to move said lock arm from said second position to said first position and back to said second position and in unison to move said operating arm in a manner whereby said pawl engages one of said grooves and moves said rotatable member through an arc equal to the distance between grooves in the period when said lock arm is not engaged with said grooves, said manually operable means including means moving such a frame in said viewing means back into position in said bank of frames before said rotatable members are unlocked and preventing frames from the bank from entering said guide means during the operating cycle and permitting the frame from the bank aligned with said guide means to move downward into said viewing means at the end of the operating cycle when said rotatable members are locked in position; manually operable means including a sliding cam mounted in said housing to slide horizontally and a manually-operable operating handle connected to said cam and operative to move said cam and the lower ends of said lock and operating arms bearing on said cam and movement of said cam back and forth by said operating handle in an operating cycle moving said lock arm between said second position and said first position; and said means for moving the frames being a lifter member pivotally mounted in said housing having a first arm positioned to bear on the lower edges of frames in said viewing means to raise such frames into position in said guideways when said lifter member is pivoted in a direction raising said first arm and said lifter member having a second arm bearing on said cam and said cam in starting its operating cycle first pivoting said lifter member to move such frame back into position in the guideways before pivoting said lock arm to release said rotatable members.

3. In a viewer for prints having a pair of rotatable members supported by a housing in spaced parallel position and adapted to support a bank of frames radially directed relative the axis of rotation of the rotatable members, means for orienting said rotatable members, comprising: a lock arm pivotably mounted in said housing and having one end movable between a first non-operative position and a second operative position engaging means connected to one of said rotatable members to lock the same against rotation; an operating arm pivotally mounted in said housing and a pawl mounted on said operating arm in position to be engageable with means operative to rotate one of said rotatable members when moved by said pawl; a sliding cam mounted in said frame to slide therein and a manually-operable operating handle operative to move said cam back and forth in an operating cycle and one end of said lock and operating arm bearing on said cam and movement of said cam by said operating handle in said operating cycle moving said lock arm from said second position to said first position and back to said second position and in unison moving said operating arm in a manner whereby the means associated with said pawl moves the associated rotatable member through an arc equal to the distance between frames supported by said rotatable members.

4. The subject matter of claim 3 in which there is a light for viewing frames in said housing and a switch controlling said light and in which said operating arm engages said switch during said operating cycle switching off said light during the period of movement of frames.

5. A viewer, comprising: a housing and a pair of rotatable members in spaced parallel relation supported to rotate about a common axis and adapted to support a bank of print frames radially directed relative the axis of rotation of the rotatable members, a sliding cam mounted in said housing and a manually operable external handle connected to said cam and operative to move said cam back and forth in an operating cycle, an operating arm pivotally mounted in said housing and having one end in position to be engaged by said cam to be moved during said operating cycle, means connected said operating arm to one of said rotatable members to rotate the same the distance between the print frames during the operating cycle, and a lock arm pivotally mounted in said housing and having one end positioned to be moved by said sliding cam during said operating cycle and having means connected with one of said rotatable members normally to lock the rotatable members in position until the lock arm is engaged by said cam in said operating cycle whereupon the rotatable members are released free to rotate during said operating cycle.

6. In a viewer for prints having a pair of rotatable members supported by a housing in spaced parallel position and adapted to support a bank of frames radially directed relative the axis of rotation of the rotatable members, means for orienting said rotatable members, comprising: an operating arm pivotally mounted in said housing and a pawl mounted on said operating arm in position to be engageable with toothed means operative to rotate one of said rotatable members when moved by said pawl; a sliding cam mounted in said frame to slide therein and a manually-operable operating handle operative to move said cam back and forth in an operating cycle and one end of said operating arm bearing on said cam and movement of said cam by said operating handle in said operating cycle moving said operating arm in a manner whereby said pawl moves the associated rotatable member through an arc equal to the distance between frames supported by said rotatable members.

7. In a viewer for prints having a pair of rotatable members supported by a housing spaced in parallel position and adapted to support a bank of frames radially directed relative the axis of rotation of the rotatable members, means for orienting said rotatable members, comprising: an operating arm pivotally mounted in said housing and means connected to said operating arm operative to rotate one of said rotatable members when said operating arm is moved; a sliding cam mounted in said frame to slide therein and a manually-operable operating handle operative to move said cam back and forth in an operating cycle and one end of said operating arm bearing on said cam and movement of said cam by said operating handle in said operating cycle pivoting said operating arm in a manner to move the associated rotatable member through an arc equal to the distance between frames supported by said rotary members; guide means at a viewing station under said rotatable members to guide frames to and from said bank and a lifter lever pivotally mounted in said housing and having one end bearing on said cam and the second end positioned to engage frames in said guide means and movement of said cam in said operating cycle moving the second end of said lifter lever to lift such frame into said bank prior to rotation of the rotatable members by said operating arm.

8. The improvement in a viewing housing for a radial bank of print frames, comprising: a hollow housing formed by front, back, top, bottom and side walls divided on an upright plane approximately half way between front and back dividing top, bottom and side walls, a pair of parallel upright plates positioned in said housing each disposed a short distance inside and substantially parallel to one of said side walls and each plate being divided on said upright plane, said plates having a pair of large circular aligned bearing openings therethrough centered on said upright plane and a pair of circular, rotatable frame supporting members each mounted in one of said circular bearing openings to be guided thereby, said rotatable members having guideway means on their opposed faces to support a multiplicity of print frames in a bank radially aligned relative the axis of rotation of said rotatable members, the rear divided portions of said plates having aligned horizontally extending slots open at said upright plane and a light housing inserted in said slots to be supported thereby; means for selectively lowering print frames from said guideway means to a station below the rotatable members and in front of said light; and adjustable lens means forming an eyepiece in front of said station.

References Cited in the file of this patent

UNITED STATES PATENTS

| | | |
|---|---|---|
| 24,327 | Perry | June 7, 1859 |
| 828,790 | Wait | Aug. 14, 1906 |
| 1,082,260 | Braun | Dec. 23, 1913 |
| 1,087,889 | Roesener | Feb. 17, 1914 |
| 1,328,192 | Pflaster | Jan. 13, 1920 |
| 1,768,111 | Branger | June 24, 1930 |